July 9, 1968  G. S. HARTLEY  3,391,836
ROTATABLE METERING APPARATUS FOR GRANULES
Filed March 9, 1966  2 Sheets-Sheet 1

INVENTOR
GILBERT SPENCER HARTLEY

BY Wenderoth, Lind & Ponack
ATTORNEYS

July 9, 1968 G. S. HARTLEY 3,391,836
ROTATABLE METERING APPARATUS FOR GRANULES
Filed March 9, 1966 2 Sheets-Sheet 2

INVENTOR
GILBERT SPENCER HARTLEY

BY *Wenderoth, Lind & Ponack*

ATTORNEYS

United States Patent Office 3,391,836
Patented July 9, 1968

3,391,836
ROTATABLE METERING APPARATUS
FOR GRANULES
Gilbert Spencer Hartley, Fulbourn, England, assignor to
Fisons Pest Control Limited, Harston, England
Filed Mar. 9, 1966, Ser. No. 532,922
Claims priority, application Great Britain, Mar. 9, 1965,
9,852/65
6 Claims. (Cl. 222—454)

ABSTRACT OF THE DISCLOSURE

Apparatus for the intermittent discharge of granules wherein a metering vessel is interposed between a source of supply of granules and a discharge tube, the metering vessel being so designed that upon rotation thereof through 180° about the axis of the discharge tube a discrete discharge of granules is obtained which can be accurately placed by virtue of the fact that there is no lateral movement or change in direction of the discharge tube.

The present invention relates to an improved apparatus for the intermittent discharge of granular products.

Many chemicals for use in agriculture are conveniently applied in granular form, such chemicals including for example insecticides and fertilizers. The granular products are normally selected in size by sieving, and are normally prepared in a non-sticky condition so as to form a free-flowing composition.

Such granular products are particularly suitable for application to the soil, and in many cases localised distribution of discrete quantities is required. Thus for example for protection of some plants against some pests, for example members of the cabbage genus against the root fly, it is desirable to distribute insecticide granules locally on the soil directly around the base of the young plants. General distribution of the granules may be wasteful and/or undesirable. Similarly with fertilizer application, it is desirable in many cases to apply the fertilizer locally in the neighbourhood of the plants. The present invention provides a simple device enabling this to be effected without discomfort to the operator. The apparatus according to the present invention enables the operator to direct discrete amounts of granules to a target rapidly and accurately, in a simple and non-fatiguing way, merely involving the rotation of the forearm.

Accordingly the present invention is for an apparatus for the intermittent discharge of granules comprising supply means, a metering vessel and a substantially rigid discharge tube, said metering vessel being substantially co-axial with the rigid discharge tube, and capable of being held manually, such that rotation of the metering vessel through 180° about the axis of the discharge tube by rotation of the forearm is capable of producing a discrete discharge of granules through the discharge tube, which can be readily aimed at the target.

In a preferred embodiment, the metering vessel which is adapted to be connected with the supply means and a substantially rigid discharge tube, comprises one or two conduits, substantially at right angles to the axis of the discharge tube, the conduit continuing in this direction for a distance greater than the radius of the discharge tube, then turning back substantially at 180° for substantially the same distance, and at this point adapted to be connected substantially at right angles with the discharge tube. Very suitably the metering vessel comprises two symmetrical conduits lying in the same plane on opposite sides of the axis of the discharge tube. Obviously the conduits must continue sufficiently in the direction at right angles to the axis of the discharge tube to prevent continuous runthrough of granules. The capacity of the conduit beyond the turning back point controls the volume of each discharge of granules, and should be such as to give the desired discharge.

The conduits in the metering vessel are suitably formed by a vessel divided by a baffle plate, substantially at right angles to the axis of the discharge tube, the baffle plate suitably being parallel to the greatest dimension of the vessel. The vessel is very suitably of substantially trapezoidal shape, the parallel sides being at right angles to the discharge tube, and the widest dimension being adjacent to the discharge tube.

The apparatus may be provided with a granule container remote from the metering vessel, for example shoulder-mounted, which is connected to the metering vessel by a fixed tube with rotatable mounting or a flexible tube, permitting the rotation of the metering vessel. However, where relatively small amounts are involved, as with insecticides, the supply container may be adjacent to or integral with the metering vessel, so that the whole apparatus may be held in the hand.

In operation of the apparatus according to the present invention, when the discharge tube is held obliquely with one conduit below its axis, this conduit fills with granules in the double bend but these granules cannot flow out since a granular solid, unlike a liquid, cannot flow upwards under the head of granules in the container. The tube is now quickly twisted about its axis through 180°. A portion of the granule contents of the double bend of the conduit now discharges and simultaneously the other conduit, if any, is charged.

If the vessel is provided with two opposite conduits, a metred volume of granules is discharged after every twist of the supply tube through 180°. If it is provided with one only, then the discharge occurs only after each alternate twist. In the use of the device as above described the twisting motion will be alternately clockwise and anti-clockwise for obvious conformity to the anatomy of the operator. Although it is essential that the conduit-containing metering vessels should undergo the twisting motion, it is not essential for the discharge tube to rotate, although the arrangement is simpler where it does so.

The conduits must be so dimensioned that the required quantity of granules is supplied in each operation, but it is possible to arrange that the volume supplied can be altered by pre-setting the relative positions of the separate parts of the vessel comprising the conduits.

For a fuller understanding of the invention, reference is to be had to the accompanying drawings, which show, solely by way of illustration, various embodiments of the invention.

Figure 1:
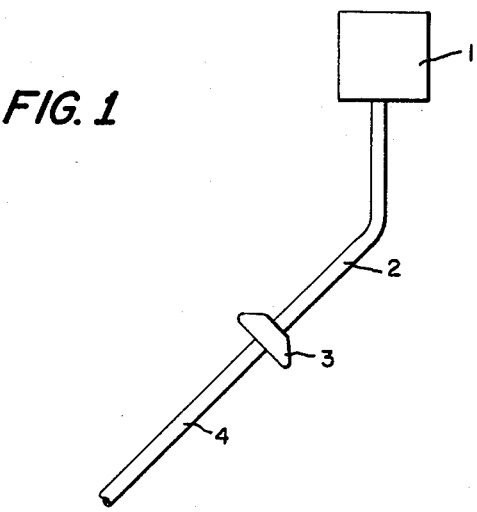
FIGURE 1 is a diagrammatic representation of the apparatus with remote supply container.
Figure 2:
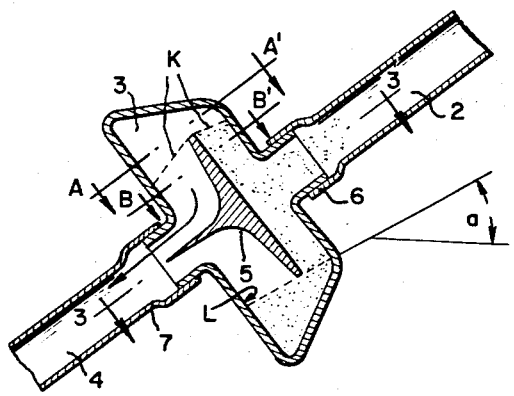
FIGURE 2 is a vertical section of the metering vessel 3, showing this in an oblique position corresponding to the position in use.
Figure 3:
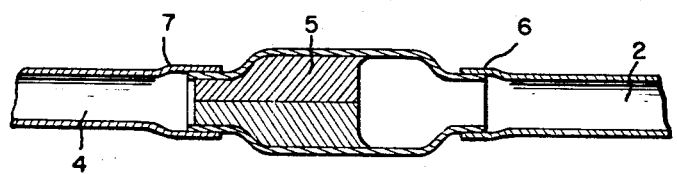
FIGURE 3 is a section in a plane perpendicular to the plane of FIGURE 2 through the axis of the discharge tube.
Figure 4:
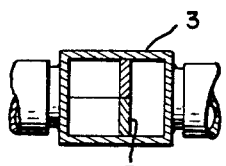
FIGURE 4 is a section in a plane perpendicular to the plane of FIGURE 2 and through line BB¹.

In FIGURE 1 the granule supply container 1 is connected by flexible tube 2 to the metering vessel 3 firmly connected to the rigid discharge tube 4. Details of the metering vessel are seen in FIGURES 2, 3 and 4. The external walls of the metering vessel 3 are of generally trapezoidal form, the longer side of the trapezoid being on the discharge side. The vessel is divided into two channels by the flat T-shaped central wall 5. The vessel is completed by walls parallel to and above and below the plane of the section, so that a section through AA¹ is rectangular, but it could be of circular or elliptical form and the internal edges are preferably rounded to ensure easy flow of the granules. The vessel is conveniently made in injection-moulded plastic material in two identical halves meeting in the plane of the section and held together by the over-fitment at 6 and 7 of the connecting supply and discharge tubes.

In FIGURE 2 the granules are shown diagrammatically in the position occupied after the contents of the region above the dotted lines K have been discharged in the direction of the arrow. The corresponding volume in the opposite channel has been filled up by gravity flow and is ready to be discharged when the device has been twisted through 180° about the axis of the supply tube. The volume so discharged is dependent on the capacity between the end of the baffle 5 and the wall of the vessel 3, but depends also on the angle of repose of the granule mass as it fills up this cavity, this angle being denoted $a$ in FIGURE 2. The proportion of the granule contents retained behind the baffle 5 and above its upper end is similarly dependent on the flow properties of the granules. It is for this reason that the outer walls of the metering vessel are made in the trapezoidal pattern shown, the greater part of the volume to be discharged being thereby made independent of the variation in angle of repose. It will be understood that the volume discharged on each occasion will also depend to some extent on the inclination of the supply tube to the horizontal. It has been shown however that an apparatus constructed as herein described supplies volumes sufficiently reproducible for the intended purpose over reasonable variations of the inclination of the supply tube and deviation from verticality of the main plane of the metering vessel, that is the plane of the section of FIGURE 2.

The limitations and latitudes on the design will now be evident. The line L in FIGURE 2, joining the lowest point of the baffle 5 and the highest point of the bottom of the discharge hole, must clearly not slope downwards to the left for any probable inclination of the supply tube, otherwise the granules in the lower metering cavity could dribble out when not intended. Further the minimum dimension in the cross section of any of the channels must be great enough not to cause obstruction to the flow of granules when desired. Obviously therefore this dimension must be greater than the greatest dimension of any granule present, and, according to the accepted standards for non-bridging of granular solids, must be at least three times the largest dimension of any granules present in significant quantity. No difficulty has been found in meeting these requirements in practice with an adequate additional margin of safety.

There is no physical reason why the channels which the granules first enter in the vessel should be straight and perpendicular to the supply tube. They could slope towards the discharge end and the flat side of the T-shaped baffle could correspondingly be of obtuse triangular form. The shape shown is preferred for simplicity of construction and economy of material. The discharge halves of the metering channels also need not be colinear. They could be turned through a small angle in the same or opposite directions with respect to the axis of the supply halves and could therefore be arranged to discharge separately, without loss of granules from one to the other, without extension of the baffle as shown into the entrance to a separate discharge tube. The form shown is again preferred on grounds of simplicity of construction rather than physics of operation.

To test the reproducibility of metering under varying conditions of use the following experiments were carried out using the apparatus illustrated in FIGURES 1 2, 3 and 4, using typical commercial granules.

| Inclination of supply tube to horizontal, deg. | Inclination of plane of metering vessel to vertical, deg. | Volume of 20 discharges, ml. |
| --- | --- | --- |
| 30 | 0 | 11.0 |
| 45 | 0 | 11.5 |
| 60 | 0 | 11.1 |
| 45 | 30 | 10.2 |

Ten separate discharges for the 45°, 0° disposition were then recorded:

0.69, 0.76, 0.76, 0.82, 0.70, 0.67, 0.77, 0.76, 0.68, 0.70 gm.

The extreme variation here is 12% above the mean of 0.73 gm. and represents more than sufficient accuracy for the intended purpose.

Figure 5:
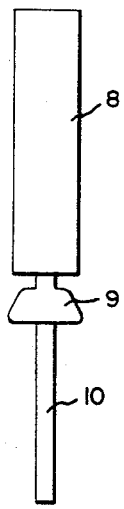
FIGURE 5 is a diagrammatic representation of the apparatus adapted to be held completely in the hand.
Figure 6:
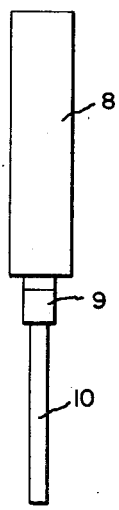
FIGURE 6 is a view at right angles to FIGURE 5.
Figure 7:
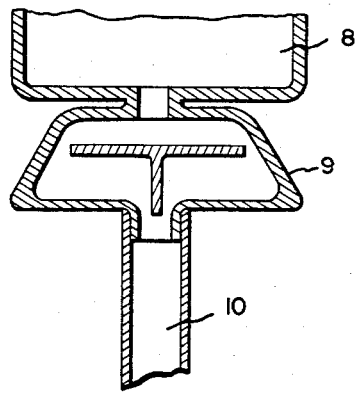
FIGURE 7 is an enlarged cross-sectional view of the metering vessel in FIGURE 5.

FIGURES 5, 6 and 7 show a slightly modified version of the apparatus shown in FIGURES 1, 2, 3 and 4, which is adapted to be completely held in the hand. The construction is essentially the same as in FIGURES 1, 2, 3 and 4, with the granule container being attached directly to the metering vessel. The apparatus comprises the granule container 8, metering vessel 9 and discharge tube 10. The metering vessel 9 is constructed in substantially the same way as the metering vessel 3. This is suitably moulded in plastic, and the corners are rounded off to assist granule flow and eliminate "dead" spaces.

A simple way to allow for variation in height of working of different operators, is to have a telescopic extension of the delivery tube so that the distance between the ground and the convenient position of hand-grip of the container can be varied, thus avoiding any tendency to hold the device at an unsatisfactory angle.

According to a further embodiment of the invention, the apparatus can also be used for the manual application and metering of fertilizer granules. For this purpose a large metering chamber, but of the same design, will normally be required. Whereas however, insecticide granules are required to be placed directly around the stem of the plant in a very localised area, it is advantageous to scatter the fertilizer granules a little distance away from the stem. For this purpose a further extension of the lead tube is provided which terminates in a Y-tube or a simple baffle plate, scattering the granules on either side of the target and avoiding direct hitting thereof.

I claim:

1. An apparatus for the intermittent discharge of granules and their accurate placement consisting essentially of a metering vessel of trapezoidal configuration, a supply vessel connected thereto, a rigid discharge tube connected to the metering vessel the latter comprising at the point of connection thereof with the supply vessel, two conduits lying in the same plane substantially at right angles to, and on opposite sides of, the axis of the discharge tube, the conduits continuing in this direction for a distance greater than the radius of the discharge tube, then turning back at 180° for substantially the same distance and at this point connecting, at right angles, with the discharge tube.

2. An apparatus as claimed in claim 1 wherein the conduits are of such capacity at the turning back point as to give the desired discrete discharge of granules.

3. An apparatus as claimed in claim 1 wherein the conduits in the metering vessel are formed by a baffle plate substantially at right angles to the axis of the discharge tube.

4. An apparatus as claimed in claim 3 wherein the baffle plate is substantially parallel to the parallel sides of the trapezoidal metering vessel.

5. An apparatus as claimed in claim 3, parallel sides of said trapezoidal metering vessel being at right angles to the discharge tube, and the widest dimension adjacent the discharge tube.

6. An apparatus for the intermittent discharge of granules and their accurate placement which comprises a supply means, a metering vessel and a discharge tube, the metering vessel being hollow, having a trapezoidal cross section in at least one direction thus providing it with larger and smaller parallel surfaces and having a T-shaped baffle, the discharge tube being coaxial with the metering vessel and directly connected to the larger surface of said metering vessel, the supply means being connected to the axis of the smaller surface of the metering vessel, and the T-shaped baffle being entirely within the metering vessel and consisting of a) a first section essentially parallel to and separated from both the larger and smaller parallel surfaces and separated from opposite non-parallel edges of the trapezoidal cross section, but otherwise extending across the metering vessel perpendicular to the axis thereof and b) a second section perpendicular to the first section, and to the trapezoidal cross section intersecting the first section and extending therefrom into the discharge opening in said larger surface, said T-shaped baffle defining with the inner surface of the metering vessel two conduits from the supply means to the discharge tube.

References Cited

UNITED STATES PATENTS

| | | | |
|---|---|---|---|
| 636,375 | 11/1899 | Beariks | 222—175 |
| 1,941,745 | 1/1934 | Higley | 222—466 |
| 2,422,263 | 6/1947 | Schara | 222—454 |
| 2,507,557 | 5/1950 | Chester | 222—455 |
| 3,189,232 | 6/1965 | Joffe | 222—402.15 |
| 3,244,324 | 4/1966 | Croslin | 222—175 |
| 1,337,805 | 4/1920 | Webb | 222—353 XR |
| 2,619,263 | 7/1947 | Duggan | 222—454 |
| 3,010,610 | 11/1961 | Marshall et al. | 222—410 XR |

ROBERT B. REEVES, *Primary Examiner.*